US012573780B2

(12) United States Patent
Shimizu

(10) Patent No.: US 12,573,780 B2
(45) Date of Patent: Mar. 10, 2026

(54) TERMINAL MODULE WITH TERMINAL HAVING PAIR OF DISPLACEMENT-RESTRICTING WALLS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Toru Shimizu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 285 days.

(21) Appl. No.: 18/283,206

(22) PCT Filed: Mar. 25, 2022

(86) PCT No.: PCT/JP2022/014665
§ 371 (c)(1),
(2) Date: Sep. 21, 2023

(87) PCT Pub. No.: WO2022/210423
PCT Pub. Date: Oct. 6, 2022

(65) Prior Publication Data

US 2024/0178596 A1 May 30, 2024

(30) Foreign Application Priority Data

Mar. 30, 2021 (JP) ................................. 2021-057264
Aug. 26, 2021 (JP) ................................. 2021-138276

(51) Int. Cl.
*H01R 13/11* (2006.01)

(52) U.S. Cl.
CPC .................................... *H01R 13/11* (2013.01)

(58) Field of Classification Search
CPC ...... H01R 13/11; H01R 13/113; H01R 13/18; H01R 11/11
(Continued)

(56) References Cited

U.S. PATENT DOCUMENTS 4,385,794 A * 5/1983 Lucius ................. H01R 4/2466 439/399
4,462,657 A * 7/1984 Snowdon ............. H01R 13/187 439/840
(Continued)

FOREIGN PATENT DOCUMENTS

JP H10-050377 A 2/1998
JP 2011-238558 A 11/2011
(Continued)

OTHER PUBLICATIONS

International Search Report issued on May 24, 2022 for WO 2022/210423 A1 (6 pages).

*Primary Examiner* — Harshad C Patel
(74) *Attorney, Agent, or Firm* — Venjuris, P.C.

(57) ABSTRACT

A terminal module according to an embodiment of the present disclosure includes a flat plate metal fitting superimposed on a mating terminal in a first direction, and an elastic member configured to press the flat plate metal fitting and the mating terminal against each other in the first direction. The flat plate metal fitting has an electric wire fixing section provided on one end side in a second direction, being a direction intersecting the first direction, and to which an electric wire is fixed, a rectangular flat plate shaped connection section provided on the other end side in the second direction and superimposed on the mating terminal, and a pair of displacement-restricting walls provided. The pair of displacement-restricting walls have a space set
(Continued)

therebetween so as to regulate rotation around an axis along the first direction of the mating terminal arranged between the displacement-restricting walls.

3 Claims, 3 Drawing Sheets

(58) Field of Classification Search
USPC .......................................................... 439/816
See application file for complete search history.

(56) References Cited

U.S. PATENT DOCUMENTS

| | | | | | |
|---|---|---|---|---|---|
| 4,713,026 | A * | 12/1987 | Mobley | H01R 13/113 439/845 |
| 4,721,471 | A * | 1/1988 | Mueller | H01R 25/003 439/78 |
| 5,458,502 | A * | 10/1995 | Joly | H01R 4/2462 439/399 |
| 5,588,884 | A * | 12/1996 | Rudoy | H01R 31/02 439/787 |
| 9,190,791 | B1 * | 11/2015 | Jaena | H01R 25/162 |
| 9,520,703 | B2 * | 12/2016 | Jaena | H02G 5/08 |
| 10,389,055 | B1 * | 8/2019 | Lui | H01R 13/187 |
| 10,530,107 | B2 * | 1/2020 | Wynnik | H01R 25/145 |
| 11,264,752 | B1 * | 3/2022 | Durse | H01R 13/115 |
| 12,107,360 | B2 * | 10/2024 | Tsukamoto | H01R 13/20 |
| 12,368,272 | B2 * | 7/2025 | Schneider | H01R 4/48 |
| 2002/0025732 | A1 * | 2/2002 | Hsieh | H01R 13/187 439/845 |
| 2004/0040733 | A1 * | 3/2004 | Yuasa | H01R 13/17 174/68.2 |
| 2007/0066152 | A1 * | 3/2007 | Mohs | H01R 13/187 439/843 |
| 2007/0149050 | A1 * | 6/2007 | Oka | H01R 13/03 439/595 |
| 2008/0293287 | A1 * | 11/2008 | Zinn | H01R 13/113 439/370 |
| 2010/0124857 | A1 | 5/2010 | Kawamura et al. | |
| 2010/0203757 | A1 * | 8/2010 | Mostoller | H01R 25/162 439/510 |
| 2012/0264317 | A1 * | 10/2012 | Balcerak | H01R 9/2675 439/212 |

FOREIGN PATENT DOCUMENTS

| | | | |
|---|---|---|---|
| JP | 2017-204396 | A | 11/2017 |
| WO | 2021/145197 | A1 | 7/2021 |

* cited by examiner

TERMINAL MODULE WITH TERMINAL HAVING PAIR OF DISPLACEMENT-RESTRICTING WALLS

CROSS REFERENCE TO RELATED APPLICATIONS

This application is a national phase of PCT application No. PCT/JP2022/014665, filed on 25 Mar. 2022, which claims priority from Japanese patent application Nos. 2021-057264 and 2021-138276, filed on Mar. 30, 2021 and Aug. 26, 2021, respectively, all of which are incorporated herein by reference.

TECHNICAL FIELD

The present disclosure is related to a terminal module.

BACKGROUND

Patent Document 1 discloses a female terminal connected to a male terminal in a flat plate shape expressed as a tab shape or the like. The female terminal includes a main body section in a square cylindrical shape, and an elastic contact piece and bead arranged in opposition to each other inside the main body section. Also, conduction between the male terminal and the female terminal is achieved by clamping the male terminal inserted from an opened part of the main body section between the bead and the elastic contact piece.

PRIOR ART DOCUMENT

Patent Document

Patent Document 1: JP 2017-204396 A

SUMMARY OF THE INVENTION

Problems to be Solved

Incidentally, in the configuration of Patent Document 1, there is a backlash between the female terminal and the male terminal. In detail, the female terminal and the male terminal are capable of slightly rotating in a relative manner around an axis along a direction in which the terminals are superimposed. In particular, in the case where a large-diameter electric wire is connected to the female terminal, the electric wire will be thick and heavy, and vibrations of a connection portion between the male terminal and the female terminal, due to vehicle vibrations, will become significant. In such a case, a rotation displacement force will easily occur, with the electric wire extending in a direction away from the female terminal as an arm, centered on the connection portion of the female terminal. As a result of this, in the structure of Patent Document 1, there is the possibility that the surface plating of the connection portion of the female terminal will wear away.

Accordingly, a terminal module with a novel structure is disclosed, which can suppress rotation displacement centered on a connection portion with a mating terminal.

Means to Solve the Problem

A terminal module of the present disclosure includes a terminal superimposed on a mating terminal in a first direction, and an elastic member configured to press the terminal and the mating terminal against each other in the first direction, the terminal having an electric wire fixing section provided on one end side in a second direction, the second direction being a direction intersecting the first direction, the electric wire fixing section having an electric wire fixed thereto, a rectangular flat plate shaped connection section provided on the other end side in the second direction and superimposed on the mating terminal, and a pair of displacement-restricting walls provided so as to protrude from the connection section in the first direction, and the pair of displacement-restricting walls having a space set therebetween so as to regulate rotation around an axis along the first direction of the mating terminal arranged between the displacement-restricting walls.

Effect of the Invention

According to the terminal module of the present disclosure, rotation displacement centered on a connection portion with a mating terminal can be suppressed.

DETAILED DESCRIPTION TO EXECUTE THE INVENTION

Description of Embodiments of Present Disclosure

Figure 1:
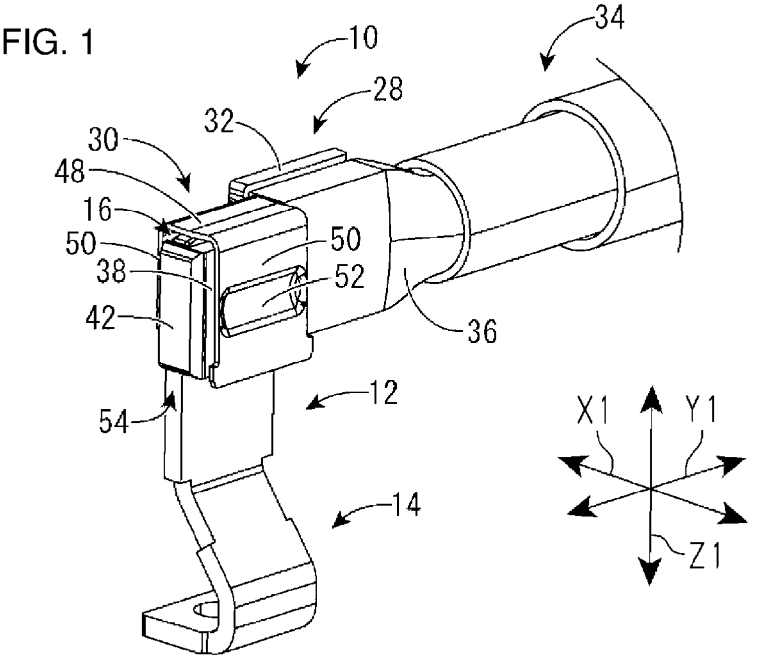
FIG. 1 is an overall perspective view of a terminal module according to Embodiment 1, in a state where a mating terminal is connected to the terminal module, to which an electric wire is connected.

Firstly, the embodiments of the present disclosure will be listed and described.

(1) A terminal module of the present disclosure: includes a terminal superimposed on a mating terminal in a first direction, and an elastic member configured to press the terminal and the mating terminal against each other in the first direction, the terminal having an electric wire fixing section provided on one end side in a second direction, the second direction being a direction intersecting the first direction, the electric wire fixing section having an electric wire fixed thereto, a rectangular flat plate shaped connection section provided on the other end side in the second direction and superimposed on the mating terminal, and a pair of displacement-restricting walls provided so as to protrude from the connection section in the first direction, and the pair of displacement-restricting walls having a space set therebetween so as to regulate rotation around an axis along the first direction of the mating terminal arranged between the displacement-restricting walls.

According to the terminal module of the present disclosure, rotation around an axis along the first direction of the mating terminal arranged between the displacement-restricting walls is regulated, by the pair of displacement-restricting walls. In particular, in the case where the electric wire fixed to the electric wire fixing section of the terminal is thick and heavy, a rotation displacement force will be exerted on the terminal module, with the electric wire extending in a direction away from the connection section as an arm, centered on the connection section of the terminal, being a connection portion to the mating terminal, due to the weight of the electric wire. In such a case, rotation displacement of the terminal module with respect to the mating terminal is suppressed or prevented, by the displacement-restricting walls of the terminal module being brought into contact with the mating terminal, at both sides of the terminal module in the rotation displacement direction. In this way, rotation displacement of the terminal module, centered on the connection portion with the mating terminal, is suppressed.

(2) It is preferable that the pair of displacement-restricting walls are spaced apart in opposition to each other in the second direction, one of the pair of displacement-restricting walls is formed by an end part of the other end side of the terminal in the second direction being bent in the first direction, and the other of the pair of displacement-restricting walls is formed by an intermediate portion of the terminal in the second direction being bent into a crank shape. The pair of displacement-restricting walls are arranged spaced apart from each other in the second direction. Accordingly, by adopting a mating terminal of a type that is assembled with the connection section from a direction orthogonal to the second direction, as the mating terminal, rotation displacement of the terminal module, with the electric wire extending from the electric wire fixing section as an arm, centered on the connection section of the terminal module, can be suitably suppressed or prevented.

(3) It is preferable that the pair of displacement-restricting walls are spaced apart in opposition to each other in a third direction, being a direction intersecting the first direction and intersecting the second direction, and the pair of displacement-restricting walls are formed by both end parts of the connection section in the third direction being bent in the first direction. The pair of displacement-restricting walls are arranged spaced apart from each other in the third direction. Accordingly, by adopting a mating terminal of a type that is assembled with the connection section from the second direction, as the mating terminal, rotation displacement of the terminal module, with the electric wire extending from the electric wire fixing section as an arm, centered on the connection section of the terminal module, can be suitably suppressed or prevented.

(4) It is preferable that a stepped section is provided between the electric wire fixing section and the connection section, by an intermediate portion of the terminal in the second direction being bent into a crank shape. Since a stepped section is provided between the electric wire fixing section and the connection section, displacement of the mating terminal inserted between the pair of displacement-restricting walls to the electric wire fixing section side can be prescribed with a simple structure.

(5) It is preferable that the elastic member includes a connection plate, and a pair of pressing pieces protruding from both end parts of the connection plate to one side of the connection plate in a plate thickness direction and inclined in a direction of approach to each other, the pair of pressing pieces are assembled so as to clamp the mating terminal and the connection section between the pressing pieces, beads protruding in the first direction are provided on the connection section, and pressing sections protruding inwardly in the first direction are provided, at positions overlapping the beads, when projected in the first direction, on the pressing pieces. The elastic member can be manufactured with a simple structure, and the mating terminal can be stably held in a connection state. Also, beads forming connection points to the mating terminal are provided on the connection section of the terminal module, and pressing sections provided on the pressing pieces of the elastic member, protruding inwardly in the first direction, are provided at positions overlapping the beads, when projected in the first direction. As a result of this, a pressing force of the elastic member can be concentrated on bead formation regions of the connection section via the pressing sections, the connection state between the terminal module and the mating terminal can be stably held, and contact resistance can be advantageously reduced.

Details of Embodiments of Present Disclosure

Hereinafter, specific examples of the terminal module of the present disclosure will be described while referring to the figures. Note that the present disclosure is not limited to these exemplifications, and it is intended that all modifications, within a meaning and scope equivalent to the scope of the patent claims, shown by the claims, are included.

Embodiment 1

Hereinafter, a terminal module 10 of Embodiment 1 of the present disclosure will be described by using FIG. 1 to FIG. 3. The terminal module 10 is held within a female connector, which is not illustrated, and is connected to a mating terminal 12, by this female connector being fitted together with a male connector fixed to a housing of an electric device such as an inverter, which is not illustrated. Note that while the terminal module 10 can be arranged in an arbitrary orientation, hereinafter, an up-down direction, a left-right direction, and a front-rear direction, which are orthogonal to one another, will be respectively described based on the up-down direction, the left-right direction, and the front-rear direction shown within the figures. Moreover, in the present embodiment, the left-right direction is a first direction X1, the front-rear direction is a second direction Y1, and the up-down direction is a third direction Z1. Moreover, for multiple instances of a same member, there will be cases where reference numerals are attached to only some of the members, and the reference numerals of the other members are omitted.

[Mating Terminal 12]

Figure 2:
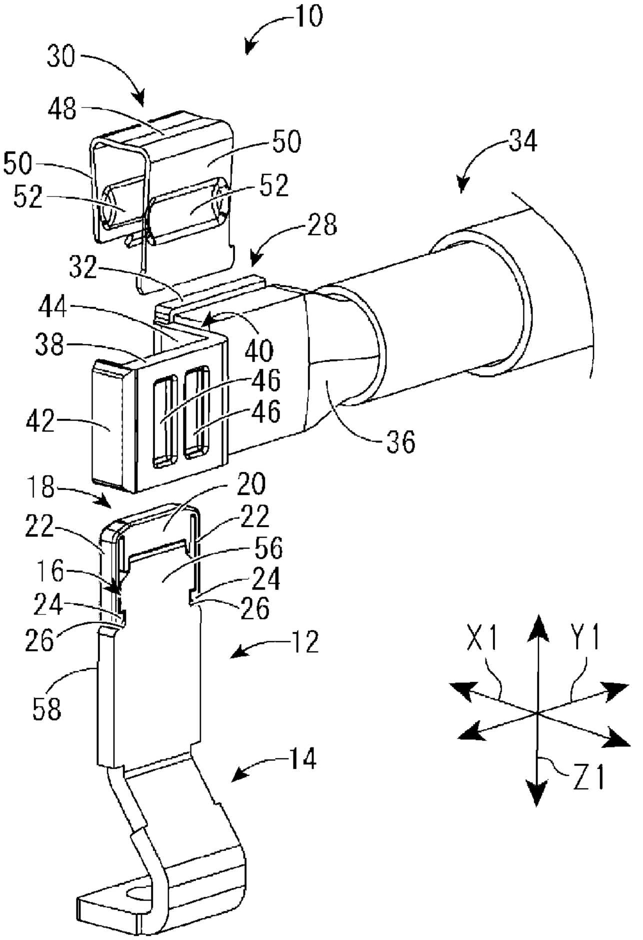
FIG. 2 is a disassembled perspective view of the terminal module of FIG. 1.

As shown in FIG. 2, the mating terminal 12 is formed with a base end part 14 of a flat plate shaped metal member being bent into an L-shape. The base end part 14 of the mating terminal 12 is connected to an electric device such as an inverter, which is not illustrated. A tip end part 16 of the mating terminal 12 is connected to the terminal module 10, by extending upward in a flat plate shape (refer to FIG. 1 and FIG. 2). Moreover, an insulating cap 18 is attached to the tip end part 16 of the mating terminal 12. The cap 18 has a gate shape in a side view, in other words, a U-shape, and has a cap body 20, and elastic engagement pieces 22 protruding downward from both end parts of the cap body 20 in the front-rear direction. Engagement projections 24 protruding toward opposite surfaces of the pair of elastic engagement pieces 22, 22 are respectively provided on a protrusion tip end part on the opposite surfaces. Notched sections 26 are provided on both end parts in the front-rear direction of the tip end part 16 of the mating terminal 12. When the cap 18 is attached to the tip end part 16 of the mating terminal 12, a fitting hole, which is not illustrated, provided on a lower surface of the cap body 20 and opened downward is fitted onto the tip end part 16 of the mating terminal 12. In addition, the engagement projections 24 engage with the notched sections 26. In this way, even if the tip end part 16 of the mating terminal 12 is exposed to the outside from the male connector, in a state where the male connector and the female connector are not fitted together, the fingers of a worker or the like making contact with the metal portion of the tip end part 16 of the mating terminal 12 can be advantageously prevented by cooperation between the cap 18 and the housing of the male connector.

[Terminal Module 10]

As shown in FIG. 2, the terminal module 10 has a flat plate metal fitting 28 as a terminal formed from a flat plate shaped metal member, and an elastic member 30 with a flat plate shaped metal member being bent into an inverted U-shape. The flat plate metal fitting 28 is superimposed on the mating terminal 12 in the first direction X1. The elastic member 30 presses the flat plate metal fitting 28 and the mating terminal 12 against each other in the first direction X1.

[Flat Plate Metal Fitting 28]

The flat plate metal fitting 28 is a flat plate shaped metal flat plate press-worked into a prescribed shape. A metal with low electrical resistance, such as copper, a copper alloy, aluminum, or an aluminum alloy, can be appropriately selected as a metal forming the metal flat plate. As shown in FIG. 2, the flat plate metal fitting 28 extends straight out toward a rear side, which is one end side in a longitudinal direction, being the front-rear direction of the flat plate metal fitting 28. An electric wire fixing section 32 is provided on one end side of the flat plate metal fitting 28 in the longitudinal direction. A core wire 36 exposed at a terminal of an electric wire 34 is welded and conductively connected to the electric wire fixing section 32. Moreover, the flat plate metal fitting 28 has a rectangular flat plate shaped connection section 38 provided on a front side, which is the other end side in the longitudinal direction, by an intermediate portion in the longitudinal direction being bent into a crank shape.

As a result of this, a stepped section 40 is provided between the electric wire fixing section 32 and the connection section 38. In addition, a tip end part of the connection section 38 in the longitudinal direction is bent into an L-shape toward the left side. In this way, as shown in FIG. 2, the front side, which is the other end side of the flat plate metal fitting 28 in the longitudinal direction, has a U-shape in a top view. Namely, both end parts of the connection section 38 in the longitudinal direction are bent to the other surface 58 side in the left-right direction, which is a plate thickness direction of the mating terminal 12, which will be described below, and a pair of displacement-restricting walls 42, 44, which protrude to the other surface 58 side of the mating terminal 12, are provided on both end parts of the connection section 38. The pair of displacement-restricting walls 42, 44 are spaced apart in opposition to each other in the front-rear direction, which is the longitudinal direction of the flat plate metal fitting 28. The displacement-restricting wall 42, which is one of the pair of displacement-restricting walls 42, 44, is formed by the other end side of the flat plate metal fitting 28 being bent to the other surface 58 side of the mating terminal 12. Moreover, the displacement-restricting wall 44, which is the other of the pair of displacement-restricting walls 42, 44, is formed by the intermediate portion of the flat plate metal fitting 28 being bent into a crank shape.

In other words, the flat plate metal fitting 28 includes the electric wire fixing section 32, the connection section 38, and the pair of displacement-restricting walls 42, 44. The electric wire fixing section 32 is provided on the rear end side, which is one end side in the second direction Y1, being a direction intersecting the first direction X1. The electric wire fixing section 32 is fixed to the core wire 36 of the electric wire 34. The connection section 38 is provided on the front end side, which is the other end side in the second direction Y1. The connection section 38 is superimposed on the mating terminal 12 in the first direction X1. The pair of displacement-restricting walls 42, 44 are provided so as to protrude from the connection section 38 in the first direction X1. The pair of displacement-restricting walls 42, 44 have a space set therebetween so as to regulate rotation around an axis along the first direction X1 of the mating terminal 12 arranged between the displacement-restricting walls 42, 44. Namely, the space between the pair of displacement-restricting walls 42, 44 is set in accordance with the width of the mating terminal 12 arranged between the pair of displacement-restricting walls 42, 44. The space between the pair of displacement-restricting walls 42, 44 is set to a space that enables the mating terminal 12 to be inserted between the pair of displacement-restricting walls 42, 44, and prevents relative rotation around an axis along the first direction X1 of the mating terminal 12 arranged between the pair of displacement-restricting walls 42, 44.

The pair of displacement-restricting walls 42, 44 of the present embodiment are spaced apart in opposition to each other in the second direction Y1. One displacement-restricting wall 42 of the pair of displacement-restricting walls 42, 44 is formed by an end part of the front end side, which is the other end side of the flat plate metal fitting 28 in the second direction Y1, being bent in the left direction, which is the first direction X1. Moreover, the other displacement-restricting wall 44 of the pair of displacement-restricting walls 42, 44 is formed by the intermediate portion of the flat plate metal fitting 28 in the second direction Y1 being bent into a crank shape. In other words, the end part of the electric wire fixing section 32 side of the connection section 38 forms the stepped section 40 and the displacement-restricting wall 44, by being bent in the left direction, which is the first direction X1. Moreover, the electric wire fixing section 32 extends backward, which is the second direction Y1, from the tip end part of the stepped section 40 and the displacement-restricting wall 44. In this way, the intermediate portion of the flat plate metal fitting 28 in the second direction Y1 is bent into a crank shape centered on the stepped section 40 and the displacement-restricting wall 44.

In addition, a pair of beads 46, 46, which are spaced apart from each other in the front-rear direction and extend in the up-down direction, and protrude in a dome shape to a protrusion side of the pair of displacement-restricting walls 42, 44, which is the first direction X1, are provided on the connection section 38. The pair of beads 46, 46 are each formed so as to extend out across substantially the entire length of the connection section 38 in the up-down direction. Accordingly, the tip end part 16 of the mating terminal 12 can be stably pressed by the pair of beads 46, 46.

[Elastic Member 30]

The elastic member 30 is formed by using a band plate of various types of metal materials, for example, spring steel, stainless steel, brass, phosphor bronze, or beryllium copper, capable of being press-worked or punch-worked. As shown in FIG. 2, the elastic member 30 includes a rectangular flat plate shaped connection plate 48, and a pair of rectangular flat plate pressing pieces 50, 50, which protrude from both side edge parts of the connection plate 48 in the left-right direction to a lower side, which is one side of the connection plate 48 in the plate thickness direction, and are inclined in a direction of approach to each other. The pair of pressing pieces 50, 50 are formed so that the right side pressing piece 50 protrudes more to the lower side than the left side pressing piece 50. As can be understood from FIG. 1 and FIG. 2, pressing sections 52, which each protrude in a dome shape toward the opposing pressing pieces 50, being the first direction X1, at a position overlapping the bead 46 of the connection section 38 of the flat plate metal fitting 28 in a side view, are provided on each of the pressing pieces 50 of the elastic member 30. The pressing sections 52 extend across substantially the entire length of the elastic member 30 in the second direction Y1. Namely, the pressing sections 52, which each protrude inwardly in the superimposing direction, at a position overlapping the beads 46, when projected in the left-right direction, being the superimposing direction between the mating terminal 12 and the flat plate metal fitting 28 of the terminal module 10, which will be described below, are provided on the pressing pieces 50 of the elastic member 30. In other words, the pressing sections 52, which each protrude inwardly in the first direction X1, at a position overlapping the beads 46, when projected in the first direction X1, are provided on the pressing pieces 50. The pair of beads 46, 46 are each formed so as to extend out across substantially the entire length in the up-down direction of the connection section 38. In this way, the tip end part 16 of the mating terminal 12 can be stably pressed against the connection section 38 of the flat plate metal fitting 28 of the terminal module 10 by the pair of pressing pieces 50, 50.

[Assembly Method of Terminal Module 10 and Mating Terminal 12]

As shown in FIG. 2, first, the flat plate metal fitting 28 and the elastic member 30 forming the terminal module 10, and the mating terminal 12, are prepared. To continue, the portion where the core wire 36 exposed at the terminal of the electric wire 34 is fixed to the electric wire fixing section 32 of the flat plate metal fitting 28, and the elastic member 30, are inserted within a female connector, which is not illustrated, and held at a prescribed position. In this state, the surface on the side of the pressing piece 50 protruding more to the lower side of the elastic member 30 opposite the other pressing pieces 50 is arranged so as to be brought into contact with, or to approach, the surface on the opposite side to the side where the pair of displacement-restricting walls 42, 44 protrude in the connection section 38. Note that the connection plate 48 of the elastic member 30 is placed on the connection section 38 of the flat plate metal fitting 28. In this way, a mating terminal accommodation section 54, which is surrounded by the connection section 38 and the pair of displacement-restricting walls 42, 44 of the flat plate metal fitting 28, and the connection plate 48 and the pressing piece 50 of the elastic member 30, and is opened downward, is formed in the terminal module 10.

Next, the mating terminal 12 is inserted within a male connector, which is not illustrated, and is held at a prescribed position. To continue, the female connector and the male connector, which are not illustrated, are fitted together. In this way, the tip end part 16 of the mating terminal 12 is inserted from the lower side with respect to the mating terminal accommodation section 54, and one surface 56, which is the right side surface of the tip end part 16 of the mating terminal 12 in the plate thickness direction, is superimposed on the rectangular flat plate connection section 38 of the flat plate metal fitting 28. Moreover, the tip end part 16 of the mating terminal 12 is inserted between the pair of displacement-restricting walls 42, 44. The pair of displacement-restricting walls 42, 44 are provided by both end parts of the connection section 38 being bent to the other surface 58 side, which is the surface on the left side of the mating terminal 12 in the plate thickness direction. In this way, the pair of pressing pieces 50, 50 of the elastic member 30 are pressed and widened in a direction to be spaced apart from each other, and the pair of pressing pieces 50, 50 are respectively assembled so as to clamp therebetween the tip end part 16 of the mating terminal 12 and the connection section 38 of the flat plate metal fitting 28 of the terminal module 10. As a result of this, the tip end part 16 of the mating terminal 12 is pressed against the connection section 38 of the flat plate metal fitting 28, by an elastic restoring force of the pair of pressing pieces 50, 50. By the above description, the assembly of the terminal module 10 and the mating terminal 12 is completed.

According to the terminal module 10 of the present disclosure with such a structure, the connection section 38 and the electric wire fixing section 32 are formed by using the flat plate metal fitting 28. A separate elastic member 30 is adopted, in order to press the tip end part 16 of the mating terminal 12 against the connection section 38 to make contact. Accordingly, simplification of the structure can be advantageously achieved, compared to a conventional female terminal in which a connection section is provided by a bead and spring piece in a main body section in a square cylindrical shape. Also, the pair of displacement-restricting walls 42, 44, which protrude to the other surface 58 side in the left-right direction, being the plate thickness direction of the mating terminal 12, are provided on both end parts of the connection section 38 of the terminal module 10 in the longitudinal direction. According to the terminal module 10 of the present disclosure, rotation around an axis along the first direction X1 of the mating terminal 12 arranged between the displacement-restricting walls 42, 44 is regulated by the pair of displacement-restricting walls 42, 44. For example, there will be cases where a rotation displacement force is exerted on the terminal module 10, with the electric wire 34 as an arm, centered on the connection section 38 of the terminal module 10, due to the weight of the electric wire 34 fixed to the electric wire fixing section 32 of the terminal module 10. In such a case, rotation displacement of the terminal module 10 with respect to the mating terminal 12 is suppressed or prevented, by the pair of displacement-restricting walls 42, 44 being brought into contact with the mating terminal 12 at both sides of the terminal module 10 in the rotation displacement direction. As a result of this, for example, abrasion between contacting surfaces of the mating terminal 12 and the terminal module 10 is suppressed. In the present embodiment, the pair of displacement-restricting walls 42, 44 are arranged spaced apart from each other in the front-rear direction, which is the longitudinal direction, being the second direction Y1 of the flat plate metal fitting 28. Moreover, the portion of the terminal module 10 that is assembled with the connection section 38 from the up-down direction orthogonal to the longitudinal direction of the terminal module 10 is adopted, as the mating terminal 12. Accordingly, rotation displacement of the terminal module 10, with the electric wire 34 as an arm, centered on the connection section 38 of the terminal module 10, can be suitably suppressed or prevented.

In addition, the elastic member 30 can be manufactured with a simple structure, in which a flat plate shaped metal member is bent into a C-shape, in other words, a U-shape, and the connection section 38 of the terminal module 10 and the mating terminal 12 can be stably held in a connection state by the elastic member 30. Also, the beads 46 forming connection points to the mating terminal 12 are provided on the connection section 38 of the terminal module 10, and the pressing sections 52 provided on the pressing pieces 50 of the elastic member 30 project inwardly in the first direction X1, and are provided at positions overlapping the beads 46, when projected in the first direction X1. In this way, since a pressing force of the elastic member 30 can be concentrated on formation regions of the beads 46 in the connection section 38 via the pressing sections 52, the connection state between the connection section 38 and the mating terminal 12 can be stably held, and contact resistance can be advantageously reduced.

Embodiment 2

Figure 4:
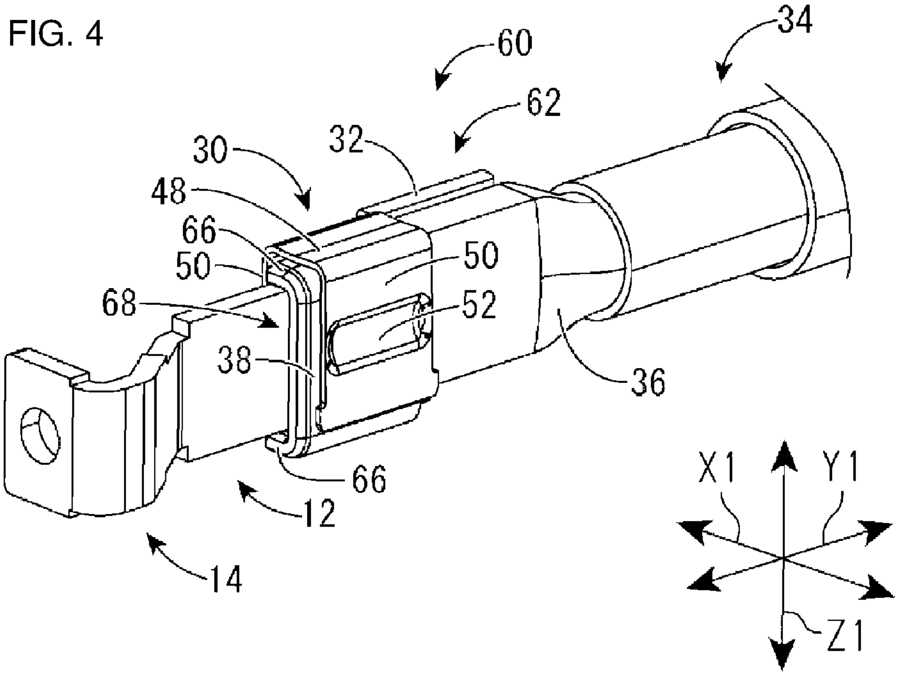
FIG. 4 is an overall perspective view of a terminal module according to Embodiment 2, in a state where a mating terminal is connected to the terminal module, to which an electric wire is connected.
Figure 5:
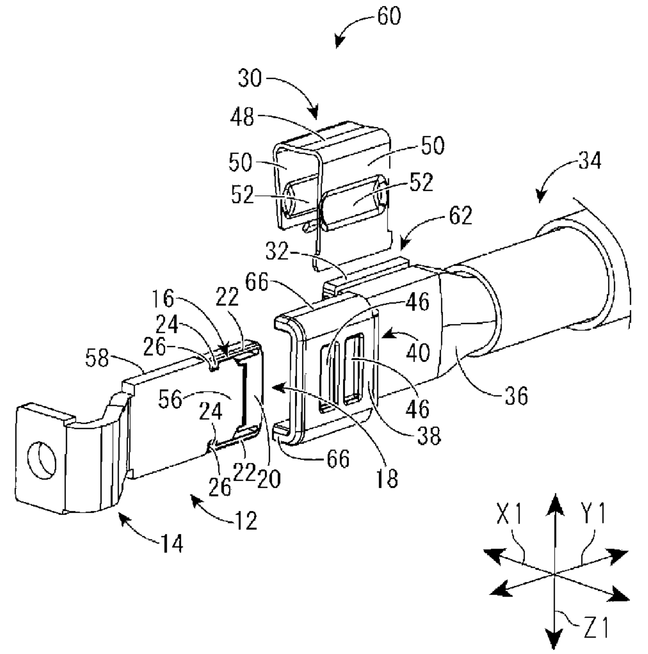
FIG. 5 is a disassembled perspective view of the terminal module of FIG. 4.
Figure 6:
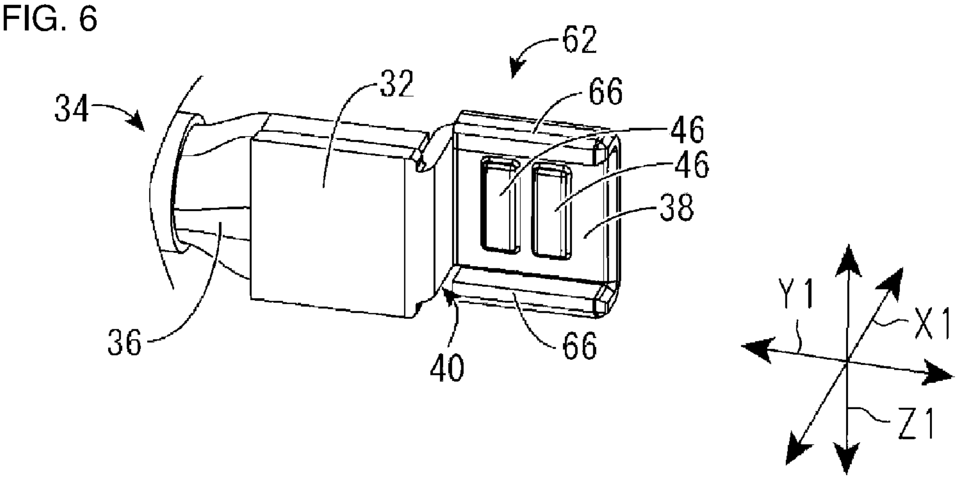
FIG. 6 is a perspective view in which the flat plate metal fitting of FIG. 5 is seen from a different direction.

A terminal module 60 of Embodiment 2 of the present disclosure is shown in FIG. 4 to FIG. 6. In the following description, the same reference numerals within the figures are attached to members and components substantially the same as those of Embodiment 1, and a description of these members and components will be omitted.

In the terminal module 60 of Embodiment 2, a flat plate metal fitting 62 has an electric wire fixing section 32 provided on a rear side, which is one end side in the longitudinal direction, and a rectangular flat plate shaped connection section 38 provided on a front side, which is the other end side in the longitudinal direction, by an intermediate portion in the longitudinal direction being bent into a crank shape. Namely, a stepped section 40 is provided between the electric wire fixing section 32 and the connection section 38. On the other hand, in the terminal module 60 of Embodiment 2, a pair of displacement-restricting walls 66, 66 are provided spaced apart in opposition to each other in the up-down direction, which is the width direction of the flat plate metal fitting 62. Namely, in the connection section 38 of the flat plate metal fitting 62, the pair of displacement-restricting walls 66, 66 are formed by both end parts of the flat plate metal fitting 62 in the width direction being bent to the other surface 58 side of the mating terminal 12. In other words, the pair of displacement-restricting walls 66, 66 are spaced apart in opposition to each other in a third direction Z1, which is a direction intersecting the first direction X1 and intersecting the second direction Y1. The pair of displacement-restricting walls 66, 66 are formed by both end parts of the connection section 38 in the third direction Z1 being bent in the first direction X1. As a result of this, a mating terminal accommodation section 68, which is surrounded by the connection section 38 and the pair of displacement-restricting walls 66, 66 of the flat plate metal fitting 62 and the pressing pieces 50 of the elastic member 30, and is opened toward the front, is formed in the terminal module 60. When the mating terminal 12 is assembled with respect to this terminal module 60, this assembly is performed by inserting the tip end part 16 of the mating terminal 12 from the front side with respect to the mating terminal accommodation section 68.

According to such a terminal module 60 of Embodiment 2, the pair of displacement-restricting walls 66, 66 are arranged spaced apart from each other in the up-down direction, which is the width direction, being the third direction Z1 of the flat plate metal fitting 62. Also, the mating terminal 12 is connected to the connection section 38 of the terminal module 60, by being inserted into the mating terminal accommodation section 68 of the terminal module 60 from the front side of the terminal module 60 in the longitudinal direction. In this way, rotation displacement of the terminal module 60, with the electric wire 34 extending from the electric wire fixing section 32 as an arm, centered on the connection section 38 of the terminal module 60, can be suitably suppressed or prevented by the pair of displacement-restricting walls 66, 66. Also, a stepped section 40 is provided between the electric wire fixing section 32 and the connection section 38 by an intermediate portion of the flat plate metal fitting 62 in the second direction Y1 being bent into a crank shape. Accordingly, displacement of the terminal module 60 of the mating terminal 12 inserted between the pair of displacement-restricting walls 66, 66 to the electric wire fixing section 32 side can be prescribed with a simple structure.

Modified Examples

Hereinafter, while Embodiment 1 and Embodiment 2 have been described in detailed as specific examples of the present disclosure, the present disclosure is not limited by these specific descriptions. Modifications, improvements or the like in a range that can achieve the objective of the present disclosure are included in the present disclosure. For example, modified examples of the embodiments such as follows are included in the technical range of the present disclosure.

(1) In the above Embodiments 1 and 2, while an explanation has been performed by exemplifying a U-shaped clip as the elastic member 30, it is not limited to this. An elastic member with an arbitrary structure can be adopted, such as a member with a structure that exerts an energization force by using a coil spring.

(2) In the above Embodiments 1 and 2, while the electric wire fixing section 32 of the terminal module 10, 60 is fixed to the core wire 36 by welding, it is not limited to this, and it may be fixed by a publicly known technology such as calking work or mechanical clinching using a caulking piece, which is not illustrated.

(3) In the above Embodiments 1 and 2, while the terminal is the flat plate metal fitting 28, 62 formed from a flat plate shaped metal member, it is not limited to this, and may be, for example, a terminal formed from a metal member with a thickness that varies from portion to portion.

(4) The displacement-restricting walls 42, 44, 66 of the above Embodiments 1 and 2 may be modified to another configuration, if they are provided so as to protrude from the connection section 38 in the first direction X1. For example, while the other displacement-restricting wall 44 of the pair of displacement-restricting walls 42, 44 in Embodiment 1 is formed by the intermediate portion of the flat plate metal fitting 28 in the second direction Y1 being bent into a crank shape, it is not limited to this, and may be formed by a shape other than a crank shape. For example, the displacement-restricting wall 44 may be formed firstly by the end part on the electric wire fixing section 32 side of the connection section 38 being bent in the left direction, which is the first direction X1, and then formed in a shape folded to the right side.

(5) The shape of each of the beads 46 of the above Embodiments 1 and 2 may be changed to another shape. Moreover, the number of beads 46 may be changed to another number.

(6) The shape of each of the pressing sections 52 of the above Embodiments 1 and 2 may be changed to another shape. Moreover, the number of pressing sections 52 may be changed to another number.

(7) In the above Embodiments 1 and 2, while the first direction X1, the second direction Y1, and the third direction Z1 are formed orthogonal to one another in the flat plate metal fitting 28, 62, they are not limited to this, and the first direction X1, the second direction Y1, and the third direction Z1 may be formed not strictly orthogonal to one another, or intersecting one another.

The combination of the flat plate metal fitting 28, 62, the elastic member 30, and the mating terminal 12 of the embodiments may be referred to as a terminal-terminal coupling structure.

The mating terminal 12 of the embodiments may be referred to as a first plate shaped terminal or a vehicle side bending plate shaped terminal. The surface 56 of the mating terminal 12 may be referred to as a planar contact surface. The insulating cap 18 may form a plurality of end surfaces of the mating terminal 12, and a tip end surface and a pair of side end surfaces of the mating terminal 12 are included in the plurality of end surfaces of the mating terminal 12. Angles formed between the surface 56 and each end surface of the mating terminal 12 may be referred to as edges or outward-facing corners of the mating terminal 12.

The flat plate metal fitting 28 of the embodiments may be referred to as a second plate shaped terminal or an electric wire side bending plate shaped terminal. The pair of displacement-restricting walls (42, 44, 66) of the flat plate metal fitting 28 of the embodiments may be referred to as positioning plates or rotation stoppers for positioning the connection section 38 of the flat plate metal fitting 28 and the surface 56 of the mating terminal 12, so that the connection section 38 of the flat plate metal fitting 28 and the surface 56 of the mating terminal 12 do not rotate relative to one another. The connection section 38 of the flat plate metal fitting 28, 62 of the embodiments may be referred to as a rectangular flat plate section. In the flat plate metal fitting 28, 62 of the embodiments, angles formed by the connection section 38 and each of the displacement-restricting walls 42, 44, 66 may be referred to as inward-bending corners for positioning. The elastic member 30 of the embodiments may be referred to as a U-shaped plate shaped clip.

The terminal module 10, 60 of the embodiments may be referred to as a vehicle terminal module.

Hereinafter, embodiments of the present disclosure will be listed and described.

(1) The terminal module of the present disclosure is a terminal module connected to a mating terminal in a flat plate shape, and includes a flat plate metal fitting and an elastic member, the flat plate metal fitting has an electric wire fixing section provided on one end side of the flat plate metal fitting in a longitudinal direction, a rectangular flat plate shaped connection section provided on the other end side in the longitudinal direction and superimposed on the mating terminal at one surface in a plate thickness direction, and a pair of displacement-restricting walls provided so as to protrude to the other surface side of the mating terminal in the plate thickness direction at both end parts of the connection section, and the elastic member presses the mating terminal superimposed on the connection section against the connection section, by being inserted between the pair of displacement-restricting walls.

According to the terminal module of the present disclosure, the connection section and electric wire fixing section are formed by using the flat plate metal fitting, and a separate elastic member is adopted, in order to press the mating terminal against the connection section. Accordingly, simplification of the structure can be advantageously achieved, compared to a conventional female terminal in which a connection section is provided by a bead and spring piece in a main body section in a square cylindrical shape. Also, the pair of displacement-restricting walls, formed so as to protrude to the other surface side on the opposite side to the one surface of the mating terminal in the plate thickness direction, which is in contact with the connection section, are provided on both end parts of the connection section. Here, in the case where the electric wire fixed to the electric wire fixing section of the flat plate metal fitting is thick and heavy, a rotation displacement force will be exerted on the terminal module, with the electric wire extending in a direction away from the connection section as an arm, centered on the connection section of the flat plate metal fitting, which is a connection portion to the mating terminal, due to the weight of the electric wire. In such a case, rotation displacement of the terminal module is suppressed or prevented, by the displacement-restricting walls of the terminal module being brought into contact with the mating terminal, at both sides of the terminal module in the rotation displacement direction. In this way, rotation displacement of the terminal module, centered on the connection portion with the mating terminal, can be suppressed. Note that the "flat plate metal fitting" is called a flat plate shaped metal member.

(2) It is preferable that the pair of displacement-restricting walls are spaced apart in opposition to each other in the longitudinal direction of the flat plate metal fitting, one of the pair of displacement-restricting walls is formed by an end part of the one end side of the flat plate metal fitting in the longitudinal direction being bent to the other surface side, and the other of the pair of displacement-restricting walls is formed by an intermediate portion of the flat plate metal fitting being bent into a crank shape. The pair of displacement-restricting walls are arranged spaced apart from each other in the longitudinal direction of the flat plate metal fitting. Accordingly, by adopting a mating terminal of a type that is assembled with the connection section in a direction orthogonal to the longitudinal direction of the terminal module, as the mating terminal, rotation displacement of the terminal module, with the electric wire extending from the electric wire fixing section as an arm, centered on the connection section of the terminal module, can be suitably suppressed or prevented.

(3) It is preferable that the pair of displacement-restricting walls are spaced apart in opposition to each other in the width direction of the flat plate metal fitting, and in the connection section, the pair of displacement-restricting walls are formed by both end parts of the flat plate metal fitting in the width direction being bent to the other surface side. The pair of displacement-restricting walls are arranged spaced apart from each other in the width direction of the flat plate metal fitting. Accordingly, by adopting a mating terminal of a type that is assembled with the connection section in the longitudinal direction of the terminal module, as the mating terminal, rotation displacement of the terminal module, with the electric wire extending from the electric wire fixing section as an arm, centered on the connection section of the terminal module, can be suitably suppressed or prevented.

(4) It is preferable that a stepped section is provided between the electric wire fixing section and the connection section, by an intermediate portion of the flat plate metal fitting being bent into a crank shape. In the above (3), since a stepped section is provided between the electric wire fixing section and the connection section, by an intermediate portion of the flat plate metal fitting being bent into a crank shape, displacement of the mating terminal inserted between the pair of displacement-restricting walls to the electric wire fixing section side can be prescribed with a simple structure.

(5) It is preferable that the elastic member includes a connection plate, and a pair of pressing pieces protruding from both end parts of the connection plate to one side of the connection plate in a plate thickness direction, and inclined in a direction of approach to each other, the pair of pressing pieces are assembled so as to clamp the mating terminal and the connection section between the pressing pieces, beads protruding to a protruding side of the pair of displacement-restricting walls are provided on the connection section, and pressing sections protruding inwardly in the superimposing direction are provided, at positions overlapping the beads, when projected in the superimposing direction between the mating terminal and the connection section, on the pressing pieces of the elastic member. The elastic member can be manufactured with a simple structure, and the mating terminal can be stably held in a connection state. Also, beads forming connection points to the mating terminal are provided on the connection section of the terminal module, and pressing sections provided on the pressing pieces of the elastic member, protruding inwardly in the superimposing direction between the terminal module and the mating terminal, are provided at positions overlapping the beads, when projected in the superimposing direction. As a result of this, a pressing force of the elastic member can be concentrated on bead formation regions of the connection section via the pressing sections, the connection state between the terminal module and the mating terminal can be stably held, and contact resistance can be advantageously reduced.

(6) Some of the embodiments of the present disclosure are directed to a terminal-terminal coupling structure (12, 30, 28; 62), the terminal-terminal coupling structure (12, 30, 28; 62) can include:

a first plate shaped terminal (12) having a tip end flat plate part (16), a second plate shaped terminal (28; 62) that includes an electric wire fixing section (32) formed so as to be fixedly connected to an electric wire (34) and having a base end, a tip end being a free end on the opposite side of the electric wire fixing section (32), and a rectangular flat plate section (38) formed between this tip end and the electric wire fixing section (32), and a U-shaped plate shaped clip (30) formed so as to elastically clamp the tip end flat plate part (16) of the first plate shaped terminal (12) and the rectangular flat plate section (38) of the second plate shaped terminal (28; 62), the tip end flat plate part (16) of the first plate shaped terminal (12) can have a polygonal outline that includes a planar contact surface (56) that is conceivably a main surface, a plurality of end surfaces orthogonal to the planar contact surface (56), and a plurality of edges or outward-facing corners respectively formed between the planar contact surface (56) and the plurality of edge surfaces, and the second plate shaped terminal (28; 62) can include a pair of positioning plates (42, 44; 66) respectively formed so as to be simultaneously in contact with two end surfaces included in the plurality of end surfaces of the first plate shaped terminal (12), at the time when the rectangular flat plate section (38) of the second plate shaped terminal (28; 62) is superimposed on, and makes contact with, the planar contact surface (56) of the first plate shaped terminal (12).

(7) As shown in FIGS. 2, 3, 5, and 6, in some of the embodiments of the present disclosure, the pair of positioning plates (42, 44; 66) of the second plate shaped terminal (28; 62) may be connected to the rectangular flat plate section (38), may be orthogonal to the rectangular flat plate section (38), may be spaced apart from each other at a separation distance, and may be in opposition to each other.

Figure 3:
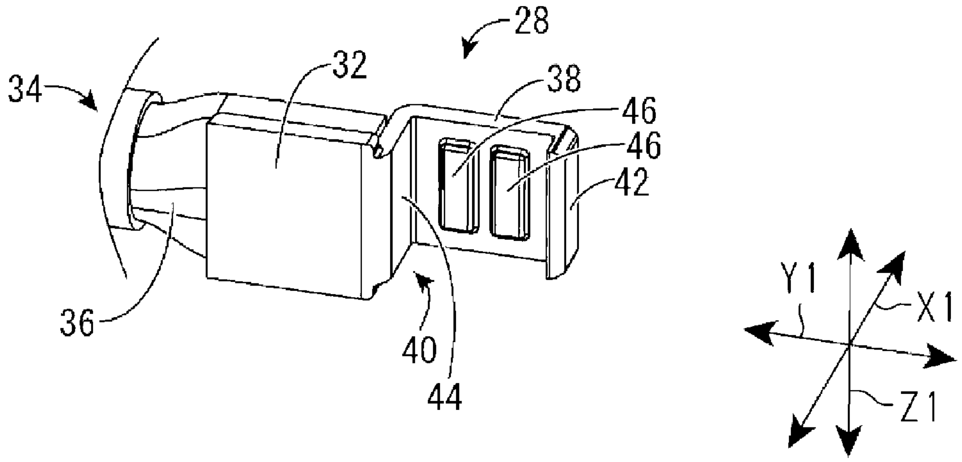
FIG. 3 is a perspective view in which the flat plate metal fitting of FIG. 2 is seen from a different direction.

(8) As shown in FIGS. 3 and 6, in some of the embodiments of the present disclosure, the rectangular flat plate section (38) of the second plate shaped terminal (28; 62) and the pair of positioning plates (42, 44; 66) may define a rectangular recessed part that fits the polygonal outline of the tip end flat plate part (16) of the first plate shaped terminal (12).

(9) As shown in FIGS. 2, 3, 5, and 6, in some of the embodiments of the present disclosure, the second plate shaped terminal (28; 62) can have inward-bending corners for positioning respectively formed between each of the pair of positioning plates (42, 44; 66) and the rectangular flat plate section (38).

(10) As shown in FIG. 3, in some of the embodiments of the present disclosure, the inward-bending corners for positioning of the second plate shaped terminal (28) can include a tip end side inward-bending corner that is nearest to the tip end of the second plate shaped terminal (28), and a non-tip end side inward-bending corner that is different to the tip end side inward-bending corner. The rectangular flat plate section (38) of the second plate shaped terminal (28; 62) may widen between the tip end side inward-bending corner and the non-tip end side inward-bending corner. The pair of positioning plates (42, 44) may be a tip end positioning plate (42) orthogonal to the rectangular flat plate section (38) widened between the tip end side inward-bending corner and the tip end, and a base end positioning plate (44) connected to the rectangular flat plate section (38) via the non-tip end side inward-bending corner, orthogonal to the rectangular flat plate section (38), spaced apart from the tip end positioning plate (42) at a separation distance, and in opposition to the tip end positioning plate (42).

(11) As shown in FIGS. 1, 2, and 3, in some of the embodiments of the present disclosure, at the time when the rectangular flat plate section (38) of the second plate shaped terminal (28; 62) is superimposed on, and makes contact with, the planar contact surface (56) of the first plate shaped terminal (12), the tip end side inward-bending corner and the non-tip end side inward-bending corner of the second plate shaped terminal (28) may directly and simultaneously make contact with, or be adjacent to, two edges or outward-facing corners included in the plurality of edges or outward-facing corners of the first plate shaped terminal (12).

(12) As shown in FIGS. 4, 5, and 6, in some of the embodiments of the present disclosure, the rectangular flat plate section (38) of the second plate shaped terminal (62) can have a tip end edge defining the tip end of the second plate shaped terminal (62), and each of the pair of positioning plates (66) of the second plate shaped terminal (62) may terminate at the tip end edge of the rectangular plate shaped section (38).

(13) In some of the embodiments of the present disclosure, the U-shaped plate shaped clip (30) can include two pressing pieces (50) formed so as to press the rectangular flat plate section (38) of the second plate shaped terminal (28; 62) and the planar contact surface (56) of the first plate shaped terminal (12) against each other, and a connection plate (48) elastically connecting the two pressing pieces (50).

(14) In some embodiments of the present disclosure, the plurality of end surfaces of the first plate shaped terminal (12) can include a tip end surface (18) orthogonal to the planar contact surface (56), and a pair of side end surfaces orthogonal to the planar contact surface (56) and the tip end surface (18). As shown in FIGS. 1 and 2, at the time when the rectangular flat plate section (38) of the second plate shaped terminal (28) is superimposed on, and makes contact with, the planar contact surface (56) of the first plate shaped terminal (12), the connection plate (48) of the U-shaped plate shaped clip (30) may make contact with, or be adjacent to, one of the plurality of end surfaces of the first plate shaped terminal (12).

LIST OF REFERENCE NUMERALS

10 terminal module (Embodiment 1)
12 mating terminal
14 base end part
16 tip end part
18 cap
20 cap body
22 elastic engagement piece
24 engagement projection
26 notched section
28 flat plate metal fitting (terminal)
30 elastic member
32 electric wire fixing section
34 electric wire
36 core wire
38 connection section
40 stepped section
42 displacement-restricting wall
44 displacement-restricting wall
46 bead
48 connection plate
50 pressing piece
52 pressing section
54 mating terminal accommodation section
56 one surface
58 other surface
60 terminal module (Embodiment 2)
62 flat plate metal fitting (terminal)
66 displacement-restricting wall
68 mating terminal accommodation section
X1 first direction
Y1 second direction
Z1 third direction

What is claimed is:

1. A terminal module comprising:
a terminal superimposed on a mating terminal in a first direction; and
an elastic member configured to press the terminal and the mating terminal against each other in the first direction,
wherein the terminal includes:
an electric wire fixing section provided on one end side in a second direction, the second direction being a direction intersecting the first direction, the electric wire fixing section having an electric wire fixed thereto;
a rectangular flat plate shaped connection section provided on the other end side in the second direction and superimposed on the mating terminal; and
a pair of displacement-restricting walls provided so as to protrude from the connection section in the first direction,
wherein the pair of displacement-restricting walls have a space set therebetween so as to regulate rotation around an axis along the first direction of the mating terminal arranged between the displacement-restricting walls,
wherein the pair of displacement-restricting walls are spaced apart in opposition to each other in the second direction,
wherein one of the pair of displacement-restricting walls is formed by an end part of the other end side of the terminal in the second direction being bent in the first direction, and
wherein the other of the pair of displacement-restricting walls is formed by an intermediate portion of the terminal in the second direction being bent into a crank shape.

2. A terminal module comprising:
a terminal superimposed on a mating terminal in a first direction; and
an elastic member configured to press the terminal and the mating terminal against each other in the first direction,
wherein the terminal includes:
an electric wire fixing section provided on one end side in a second direction, the second direction being a direction intersecting the first direction, the electric wire fixing section having an electric wire fixed thereto;
a rectangular flat plate shaped connection section provided on the other end side in the second direction and superimposed on the mating terminal; and
a pair of displacement-restricting walls provided so as to protrude from the connection section in the first direction,
wherein the pair of displacement-restricting walls have a space set therebetween so as to regulate rotation around an axis along the first direction of the mating terminal arranged between the displacement-restricting walls,
wherein the pair of displacement-restricting walls are spaced apart in opposition to each other in a third direction, being a direction intersecting the first direction and intersecting the second direction,
wherein the pair of displacement-restricting walls are formed by both end parts of the connection section in the third direction being bent in the first direction, and
wherein a stepped section is provided between the electric wire fixing section and the connection section by an intermediate portion of the terminal in the second direction being bent into a crank shape.

3. A terminal module comprising:

a terminal superimposed on a mating terminal in a first direction; and an elastic member configured to press the terminal and the mating terminal against each other in the first direction, wherein the terminal includes:

an electric wire fixing section provided on one end side in a second direction, the second direction being a direction intersecting the first direction, the electric wire fixing section having an electric wire fixed thereto;

a rectangular flat plate shaped connection section provided on the other end side in the second direction and superimposed on the mating terminal; and a pair of displacement-restricting walls provided so as to protrude from the connection section in the first direction, wherein the pair of displacement-restricting walls have a space set therebetween so as to regulate rotation around an axis along the first direction of the mating terminal arranged between the displacement-restricting walls, wherein the elastic member includes a connection plate, and a pair of pressing pieces protruding from both end parts of the connection plate to one side of the connection plate in a plate thickness direction and inclined in a direction of approach to each other, wherein the pair of pressing pieces are assembled so as to clamp the mating terminal and the connection section between the pressing pieces, wherein beads protruding in the first direction are provided on the connection section, and wherein pressing sections protruding inwardly in the first direction are provided at positions overlapping the beads, when projected in the first direction, on the pressing pieces.

* * * * *